March 5, 1935.   G. A. STACKHOUSE   1,993,190
SPRING ASSEMBLING APPLIANCE
Filed June 20, 1934
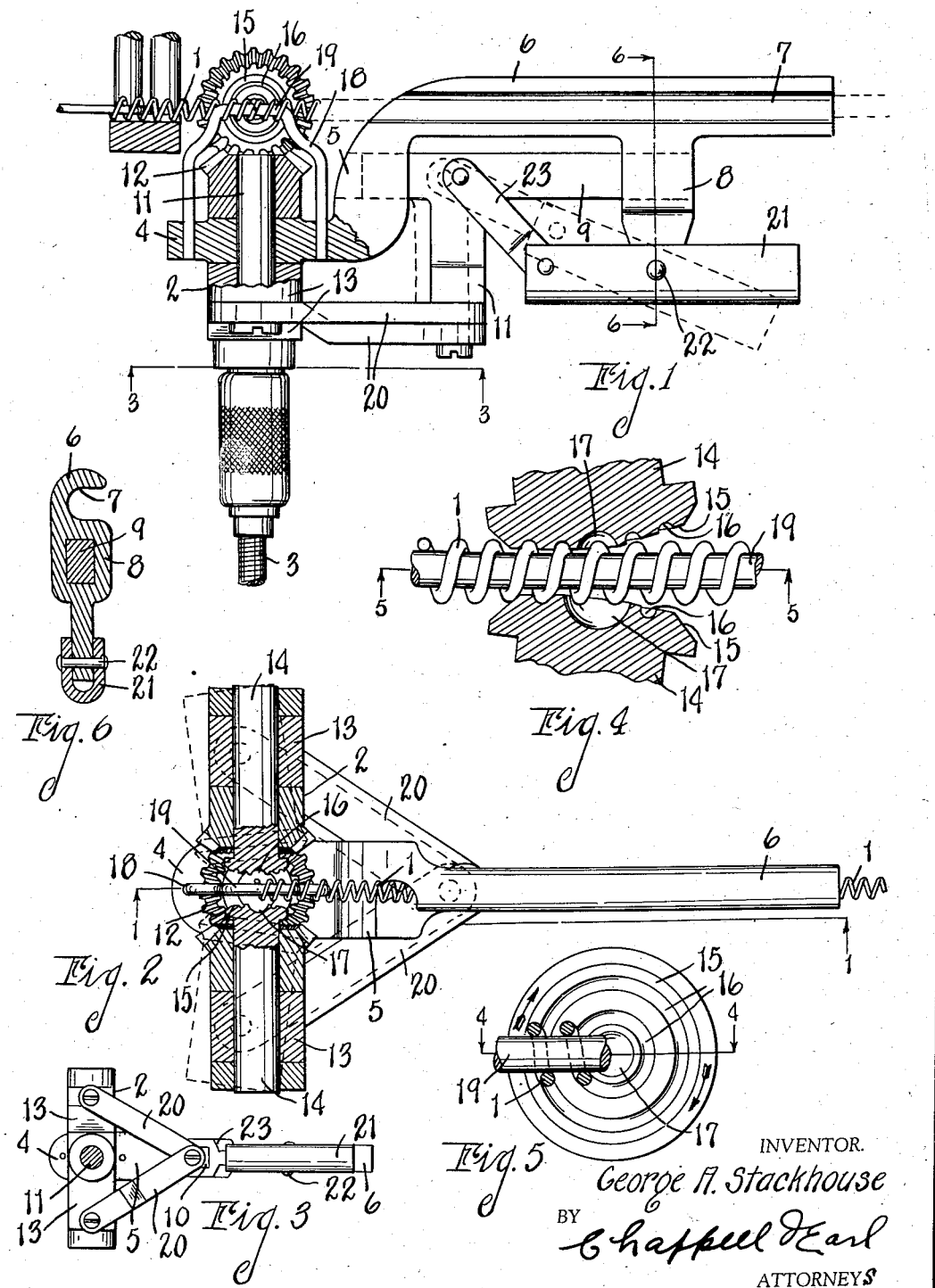
INVENTOR.
George A. Stackhouse
BY Chappell & Earl
ATTORNEYS Patented Mar. 5, 1935

1,993,190

UNITED STATES PATENT OFFICE 1,993,190

SPRING ASSEMBLING APPLIANCE

George A. Stackhouse, Oakland, Calif., assignor to L. A. Young Spring and Wire Corporation, Detroit, Mich.

Application June 20, 1934, Serial No. 731,421

25 Claims. (Cl. 140—3)

The main objects of this invention are:

First, to provide a spring assembling appliance which is well adapted for rotating helical tie members in assembling them with the body springs of spring structures such as mattress filling units, cushion springs, and the like.

Second, to provide a device of this character having a control associated therewith by means of which the helical tie member can be located, and advanced, stopped or retracted, the control being very sensitive and easy to operate.

Third, to provide a spring assembling device adapted for hand manipulation, which is at the same time of very large capacity and capable of use in any desired relation to the springs to be assembled.

Fourth, to provide a spring assembling appliance which is very simple and economical in its parts and durable in use.

Objects relating to details and economies of my invention will appear from the description to follow. The invention is defined and pointed out in the claims.

A structure which is a preferred embodiment of my invention will appear from the description to follow. The invention is defined and pointed out in the claims.

A structure which is a preferred embodiment of my invention is illustrated in the accompanying drawing, in which:

Fig. 1 is a fragmentary view mainly in side elevation and partially in vertical section of a spring assembly appliance embodying the features of my invention, the section being taken on line 1—1 of Fig. 2.

Fig. 2 is a view in top plan and partially in horizontal section showing the parts in neutral position.

Fig. 3 is a reduced section on a line corresponding to line 3—3 of Fig. 1.

Fig. 4 is an enlarged fragmentary section taken on a line corresponding to line 4—4 of Fig. 5, the parts being shown in driving relation with the helical tie member.

Fig. 5 is a fragmentary view mainly in section on line 5—5 of Fig. 4.

Fig. 6 is a transverse vertical section taken on line 6—6 of Fig. 1.

Referring to the drawing, 1 is a helical tie member of the type now extensively used in connecting the terminal coils of coiled body springs, the helical members being screwed or threaded into engagement with parts of the end coils of the spring to be connected, as shown in my copending applications. While my apparatus is adapted to handle helicals of this specific type, nevertheless it will, of course, be understood that it is adapted to handle helicals regardless of the use thereof.

In the illustrated embodiment, 2 in general indicates my spring assembly appliance which is connected by a suitable flexible cable 3 to a continuously operating uni-directional power source such as a stationary electric motor or the like (not shown). My spring assembly appliance comprises a portable support 4, an upwardly extending shank 5, and a handle 6 having a laterally facing work guiding channel 7 therein. The handle has an arm 8 depending therefrom. A slide 9 is reciprocatingly mounted in this arm and in the shank 5, as shown.

In the support 4, I journal the drive shaft 11 which is adapted to be constantly driven by the power source through the flexible cable 3. The beveled driving gear 12 is fixed to the upper end of the drive shaft with its lower end resting on the support in bearing engagement therewith. Thus, the driving gear is adapted to rotate with the drive shaft.

Mounted below the support 4 are a pair of opposed laterally arranged cranks 13, 13 adapted for rocking movement relative to the axis of the drive shaft 11. Opposed rollers 14. 14 are journaled to the cranks and have beveled or conical faces 15, 15 provided with annular grooves 16 and central recesses 17. As illustrated in Fig. 4, one of the faces has two concentric grooves while the other face has only one, the arrangement being such that the grooves receive convolutions of the helical tie member 1 when the rollers are rocked to cause the engagement of the faces therewith. When the rollers are axially alined, the faces are in neutral position and the continuous rotation of the drive shaft, and consequently the rotation of the rollers, has no effect on the helical tie member.

On the support 4, I mount a yoke-like arbor 18 having a top central portion 19 axially alined with the channel 7 for supporting the helical tie member between the faces of the rollers, the central portion also coacting with the guide to direct the helical tie member. The shoulders of the yoke provide abutments engaged by the coils so that when the helical is rotated, it is positively advanced or retracted, depending on the direction of rotation. When the journals of the roller are in axial alinement, as shown by full lines in Fig. 2, the parts are in neutral position. The arbor 18 also provides a positive connection with the helical tie member for initially positioning and otherwise manipulating the latter.

The depending arm 10 of the slide 9 is connected to each of the cranks 13, 13 by means of links 20, 20 so that when the slide is reciprocated the links act to rock the cranks about the axis of the drive shaft 11. The slide is reciprocated by the control lever 21 pivotally connected to the lower end of the arm 9 at 22, the inner end of the control lever being connected to the slide 9 by the link 23. Thus, when the control lever is tilted, as indicated by the dotted lines, the rollers are rocked to the position illustrated by Fig. 4. The full lines show the parts in neutral position.

My appliance acts not only to advance the helical tie member longitudinally, but at the same time it acts to rotate the helical member in the proper direction. The faces of the rollers impart a screw-like turning motion to the helical tie member which is highly desirable in assembling the same with the end coils of coiled body springs. My appliance is light in weight and very easy to manipulate, the movement of the helical tie member being controlled by merely adjusting the position of the control lever 21. Thus, if the advancing helical tie member comes into engagement with an obstruction, it may be immediately stopped by throwing the control lever to neutral position and backed off by swinging the control lever to the opposite direction. The guide 6 and central portion 19 of the arbor act to direct the helical tie member as desired. On the whole, my device is very efficient and quite satisfactory for the purpose intended.

I have illustrated and described my improvements in an embodiment which I have found very practical. I have not attempted to illustrate or describe other embodiments or adaptations as it is believed that this disclosure will enable those skilled in the art to embody or adapt my improvements as may be desired.

Having thus described my invention, what I claim as new and desire to secure by Letters Patent, is:

1. In a spring structure assembling appliance, the combination of a portable support provided with an upwardly offset longitudinally channeled handle constituting a work guide, said handle having a depending arm, a slide slidably mounted on said support and said arm, said slide having a depending arm, a shaft journaled in said support, a beveled driving gear on the upper end of said shaft, opposed cranks pivotally mounted on said support with their axes coinciding with the axis of said shaft, a link connecting each of said cranks to said depending arm on said slide, a control lever pivotally connected to the lower end of said arm on said handle to be manipulated with a hand grasping the handle, a link connecting said control lever to said slide, opposed rollers journaled on said cranks, opposed beveled driven gears fixed to said rollers and meshing with said driving gear, and a yoke-like arbor mounted on said support and having a central top portion axially alined with said channel in said handle for supporting a helical tie member between the faces of said rollers and in cooperating relation therewith.

2. In a spring structure assembling appliance, the combination of a support provided with a work guide, said guide having a depending arm, a slide slidably mounted on said support and said arm, said slide having a depending arm, a shaft journaled in said support, a driving gear on the upper end of said shaft, opposed cranks pivotally mounted on said support with their axes coinciding with the axis of said shaft, a link connecting each of said cranks to said depending arm on said slide, a control lever pivotally connected to the lower end of said arm on said guide, a link connecting said control lever to said slide, opposed rollers journaled on said cranks, opposed driven gears fixed to said rollers and meshing with said driving gear, and a yoke-like arbor mounted on said support and having a central top portion axially alined with said guide for supporting a helical tie member between the faces of said rollers and in cooperating relation therewith.

3. In a spring structure assembling appliance, the combination of a support provided with a work guide, said guide having a depending arm, a slide slidably mounted on said support and said arm, said slide having a depending arm, a shaft journaled in said support, a driving gear on the upper end of said shaft, opposed cranks pivotally mounted on said support with their axes coinciding with the axis of said shaft, a link connecting each of said cranks to said depending arm on said slide, a control lever pivotally connected to the lower end of said arm on said guide, a link connecting said control lever to said slide, opposed rollers journaled on said cranks and having annularly grooved bevelled faces, opposed driven gears fixed to said rollers and meshing with said driving gear, and a yoke-like arbor mounted on said support and having a central top portion axially alined with said guide for supporting a helical tie member between the faces of said rollers and in cooperating relation therewith.

4. In a spring structure assembling appliance, the combination of a support, a slide slidably mounted on said support, a shaft journaled in said support, a driving gear on said shaft, opposed crank arms pivotally mounted on said support with their axes coinciding with the axis of said shaft, a link connecting each of said cranks to said slide, a control lever for said slide, opposed rollers journaled on said cranks and having annularly grooved conical faces, opposed driven gears fixed to said rollers and meshing with said driving gear, and an arbor mounted on said support for supporting a helical tie member between the faces of said rollers and in cooperating relation therewith.

5. In a spring structure assembling appliance, the combination of a support, a slide slidably mounted on said support, a shaft journaled in said support, a driving gear on said shaft, opposed crank arms pivotally mounted on said support with their axes coinciding with the axis of said shaft, a link connecting each of said cranks to said slide, a control lever for said slide, opposed rollers journaled on said cranks, opposed driven gears fixed to said rollers and meshing with said driving gear, and an arbor mounted on said support for supporting a helical tie member between the faces of said rollers and in cooperating relation therewith.

6. In a spring assembling appliance of the character set forth, the combination of a drive shaft having a beveled driving gear connected to one end thereof, opposed beveled driven gears meshing with said driving gear, rollers associated with the axial centers of said driven gears and having opposed annular tapered faces provided with circular grooves adapted to receive the convolutions of a helical tie member when the rollers are inclined relative to each other, the neutral position of the parts existing when the rollers are alined with each other, a yoke-like arbor having a central portion arranged at right angles to the axis of said drive shaft and at right angles to the common axis of said rollers when in alinement for receiving a plurality of the convolutions of the helical tie member, a guide having a laterally opening channel receiving the helical tie member in alinement with said central portion of the arbor, and means including a control member adapted when manipulated to change the relationship of the axes of said rollers.

7. In a spring assembling appliance of the character set forth, the combination of a drive shaft having a beveled driving gear connected to one end thereof, opposed beveled driven gears meshing with said driving gear, rollers associated with the axial centers of said driven gears and having opposed annular tapered faces provided with circular grooves adapted to receive the convolutions of a helical tie member when the rollers are inclined relative to each other, the neutral position of the parts existing when the rollers are alined with each other, a yoke-like arbor having a central portion arranged at right angles to the axis of said drive shaft and at right angles to the common axis of said rollers when in alinement for receiving a plurality of the convolutions of the helical tie member, and means including a control member adapted when manipulated to change the relationship of the axes of said rollers.

8. In a spring assembling appliance of the character set forth, the combination of a driving gear, opposed driven gears meshing with said driving gear, rollers associated with the axial centers of said driven gears and having opposed annular tapered faces provided with circular grooves adapted to receive the convolutions of a helical tie member when the rollers are inclined relative to each other, the neutral position of the parts existing when the rollers are alined with each other, an arbor arranged at right angles to the axis of said drive shaft and at right angles to the common axis of said rollers when in alinement for receiving a plurality of the convolutions of the helical tie member, a guide receiving the helical tie member in alinement with said central portion of the arbor, and means including a control member adapted when manipulated to change the relationship of the axes of said rollers.

9. In a spring assembling appliance of the character set forth, the combination of a driving gear, opposed driven gears meshing with said driving gear, rollers associated with the axial centers of said driven gears and having opposed annular tapered faces provided with circular grooves adapted to receive the convolutions of a helical tie member when the rollers are inclined relative to each other, the neutral position of the parts existing when the rollers are alined with each other, an arbor arranged at right angles to the axis of said drive shaft and at right angles to the common axis of said rollers when in alinement for receiving a plurality of the convolutions of the helical tie member, and means adapted when manipulated to change the relationship of the axes of said rollers.

10. In a spring assembling appliance of the character set forth, the combination of rollers adapted to be continuously driven and having opposed annular tapered faces provided with circular grooves adapted to receive the convolutions of a helical tie member when the rollers are inclined relative to each other, the neutral position of the parts existing when the rollers are alined with each other, an arbor arranged at right angles to the axis of said drive shaft and at right angles to the common axis of said rollers when in alinement for receiving a plurality of the convolutions of the helical tie member, and means for changing the relationship of the axes of said rollers.

11. In a spring assembling appliance of the character set forth, the combination of rollers adapted to be continuously driven and having opposed annular tapered faces provided with circular grooves adapted to receive the convolutions of a helical tie member when the rollers are inclined relative to each other, the neutral position of the parts existing when the rollers are alined with each other, and an arbor arranged at right angles to the axis of said drive shaft and at right angles to the common axis of said rollers when in alinement for receiving a plurality of the convolutions of the helical tie member.

12. In a spring assembling appliance of the character set forth, the combination of a pair of axially alined rollers adapted to be rocked relative to each other in a common plane and about a central axis extending between their inner ends and normal to said plane, the inner ends of said rollers having central recesses surrounded by inwardly tapered annular faces provided with concentric grooves adapted to receive the convolutions of a helical tie member when portions of the faces are moved into parallel relationship, a yoke-like arbor having a central portion arranged between said faces with its axis lying in said plane and extending at right angles to the common axis of said rollers when the latter are in alinement, said central portion being adapted to receive a plurality of the convolutions of the helical tie member, means for rocking said rollers to control the movement of the helical tie member on said central portion of the arbor, and means acting to constantly rotate said rollers in opposite directions so that they rotate the helical tie member as well as move it axially of itself as desired with a screw-like motion.

13. In a spring assembling appliance of the character set forth, the combination of a pair of axially alined rollers adapted to be rocked relative to each other in a common plane and about a central axis extending between their inner ends and normal to said plane, the inner ends of said rollers having central recesses surrounded by inwardly tapered annular faces provided with concentric grooves adapted to receive the convolutions of a helical tie member when portions of the faces are moved into parallel relationship, means for rocking said rollers to control the movement of the helical tie member, and means acting to constantly rotate said rollers in opposite directions so that they rotate the helical tie member as well as move it axially of itself as desired with a screw-like motion.

14. In a spring assembling appliance of the character set forth, the combination of a pair of axially alined rollers adapted to be rocked relative to each other in a common plane and about a central axis extending between their inner ends and normal to said plane, the inner ends of said rollers having central recesses surrounded by inwardly tapered annular faces provided with concentric grooves adapted to receive the convolutions of a helical tie member when portions of the faces are moved into parallel relationship, an arbor arranged between said faces with its axis lying in said plane and extending at right angles to the common axis of said rollers when the latter are in alinement, said central portion being adapted to receive a plurality of the convolutions of the helical tie member, and means acting to constantly rotate said rollers in opposite directions so that they rotate the helical tie member as well as move it axially of itself as desired with a screw-like motion.

15. In a spring assembling appliance of the character set forth, the combination of a pair of axially alined rollers adapted to be rocked relative to each other in a common plane and about a central axis extending between their inner ends and normal to said plane, the inner ends of said rollers having central recesses surrounded by inwardly tapered annular faces adapted to receive the convolutions of a helical tie member when portions of the faces are moved into parallel relationship, an arbor arranged between said faces with its axis lying in said plane and extending at right angles to the common axis of said rollers when the latter are in alinement, said central portion being adapted to receive a plurality of the convolutions of the helical tie member, and means acting to constantly rotate said rollers in opposite directions so that they rotate the helical tie member with a screw-like motion.

16. In a spring assembling appliance of the character set forth, the combination of a pair of axially alined rollers adapted to be rocked relative to each other in a common plane and about a central axis extending between their inner ends and normal to said plane, the inner ends of said rollers having central recesses surrounded by inwardly tapered annular faces, a yoke-like arbor having a central portion arranged between said faces with its axis lying in said plane and extending at right angles to the common axis of said rollers when the latter are in alinement, said central portion being adapted to receive a plurality of the convolutions of a helical tie member, means for rocking said rollers to control the movement of the helical tie member on said central portion of the arbor, and means acting to constantly rotate said rollers in opposite directions.

17. In a spring assembling appliance of the character set forth, the combination of a pair of axially alined rollers adapted to be rocked relative to each other in a common plane and about a central axis extending between their inner ends and normal to said plane, the inner ends of said rollers having central recesses surrounded by inwardly tapered annular faces, means for rocking said rollers, and means acting to constantly rotate said rollers in opposite directions.

18. In a device of the class described, the combination with an arbor, of rollers mounted on opposite sides of said arbor for oscillating movement, said rollers having conical faces with concentrically related annular grooves therein so that the rollers may be oscillated to change the relationship of their beveled faces for coaction with a helical tie member on said arbor to advance the top and retract the same, the annular grooves in the faces of said rollers receiving the coils of the helical tie member and acting to rotate the same in proper direction to longitudinally advance or retract the same.

19. A device of the class described comprising opposed facing rollers mounted for rocking adjustment about a common axis centering between the rollers, an arbor disposed in the plane of said axis between said rollers, a portable support for said rollers and arbor provided with a handle, means for simultaneously driving said rollers in opposite directions including a flexible shaft, and means for simultaneously rocking said rollers on said axis including a handpiece positioned to be manipulated by a hand grasping said handle.

20. A device of the class described comprising opposed facing oppositely driven rollers having conical faces with concentrically related annular grooves in their faces, means supporting said rollers for rocking adjustment about a common axis centering between the rollers, an arbor disposed in the plane of said axis and provided with a coil engaging shoulder, and means for simultaneously rocking said rollers on said axis.

21. A device of the class described comprising opposed facing oppositely driven rollers, means supporting said rollers for rocking adjustment about a common axis centering between the rollers, an arbor disposed in the plane of said axis and provided with a coil engaging shoulder, and means for simultaneously rocking said rollers on said axis.

22. A device of the class described comprising an arbor, rollers disposed on opposite sides of said arbor and having annular grooves in the faces thereof disposed to engage coils of a helically coiled spring threaded upon the arbor, said rollers being mounted for rocking movement about a common axis centering in said arbor so as to permit the selective engagement of the rollers with the work on either side of said axis, the rollers being positioned so that when in axial alinement they are out of engagement with the work, means for simultaneously driving said rollers in opposite directions, and means for simultaneously rocking said rollers.

23. A device of the class described comprising an arbor, rollers disposed on opposite sides of said arbor mounted for rocking movement about a common axis centering in said arbor so as to permit the selective engagement of the rollers with the work on either side of said axis the rollers being positioned so that when in axial alinement they are out of engagement with the work, means for simultaneously driving said rollers in opposite directions, and means for simultaneously rocking said rollers.

24. In a device of the class described, the combination of a work arbor, a pair of rollers mounted on opposite sides of said arbor for oscillating movement in a common plane and about a common axis centering in said arbor so as to engage with the work on either side of said axis to cooperate in rotating the work on the arbor in either direction, means for driving said rollers in opposite directions, and means for manipulating the rollers for controlling their engagement with the work.

25. In a device of the class described, the combination of an arbor, rollers mounted on opposite sides of said arbor for oscillating movement so as to engage with the work on either side of the axes of the rollers to cooperate in rotating the work on the arbor in either direction, means for driving said rollers in opposite directions, and means for manipulating the rollers for controlling their engagement with the work.

GEORGE A. STACKHOUSE.